United States Patent [19]

McAuliffe, Jr.

[11] Patent Number: 4,873,955
[45] Date of Patent: Oct. 17, 1989

[54] IDLE AIR FLOW SHUTOFF VALVE

[75] Inventor: Lawrence McAuliffe, Jr., Southfield, Mich.

[73] Assignee: Colt Industries Inc., New York, N.Y.

[21] Appl. No.: 245,651

[22] Filed: Sep. 19, 1988

[51] Int. Cl.[4] .................... F02D 41/22; F02D 41/16
[52] U.S. Cl. .................................. 123/339; 123/585
[58] Field of Search ............................... 123/339, 585

[56] References Cited

U.S. PATENT DOCUMENTS

| | | | |
|---|---|---|---|
| 4,356,802 | 11/1982 | Kern et al. ........................ | 123/339 |
| 4,494,517 | 1/1985 | Kratt et al. ...................... | 123/339 X |
| 4,573,441 | 3/1986 | Wietschorke et al. .............. | 123/339 |
| 4,662,333 | 5/1987 | Martel ............................ | 123/339 |
| 4,662,334 | 5/1987 | Wietschorke et al. .............. | 123/339 |
| 4,765,299 | 8/1988 | Wataya et al. ................... | 123/339 X |
| 4,781,161 | 11/1988 | Sausner et al. .................... | 123/339 |

Primary Examiner—Tony M. Argenbright
Attorney, Agent, or Firm—Walter Potoroka, Sr.

[57] ABSTRACT

The present invention is an idle fluid flow shutoff assembly including a throttle body having a longitudinal axis with a throttle plate disposed transversely to the longitudinal axis. The throttle body includes a secondary passageway having an inlet and an outlet to allow fluid flow to bypass the throttle plate when in a closed position. A motor is secured to the throttle body and cooperates with the secondary passageway for allowing a predetermined amount of fluid flow through the outlet. A pressure-actuated valve is moveable in response to the absence and presence of a predetermined pressure level and cooperates with the secondary passageway for allowing a predetermined amount of fluid flow to the intake manifold when the amount of fluid flow past the motor is not within predetermined limits.

21 Claims, 1 Drawing Sheet

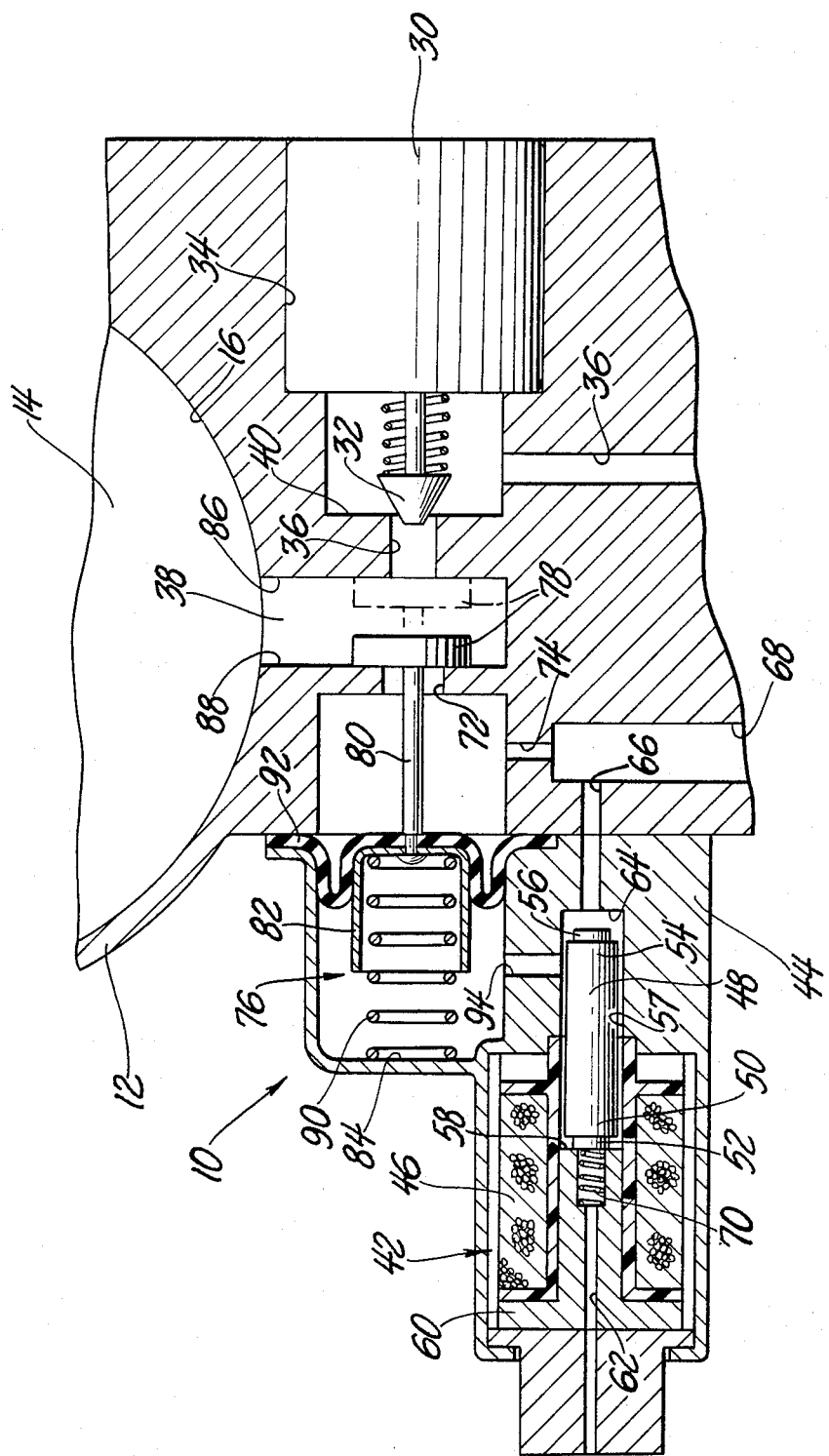

IDLE AIR FLOW SHUTOFF VALVE

BACKGROUND OF THE INVENTION

1. Field of the Invention

The present invention relates to automotive vehicles, more particularly to, fluid flow through a throttle body on an engine for automotive vehicles.

2. Description of Related Art

Currently, a throttle body on an engine has a throttle plate for controlling the amount of air that flows to the cylinders of the engine. During engine operation, the amount of air desired to perform idle speed conditions is typically controlled electronically. The path for the air to travel starts above the throttle plate, bypassing the throttle plate via a drilling from inside the throttle body, to an orifice that meters the air by means of an electronically controlled stepper motor. The air metered from the orifice is finally dumped below the throttle plate to be mixed with fuel downstream.

One problem with the current system is that a failure of the stepper motor may cause the engine to surge if a high amount of bypass air flows past the throttle plate during engine idle. Also, the engine may stall if not enough bypass air is allowed to flow during engine idle.

To overcome these problems, a solenoid-actuated valve is used to divert a predetermined amount of fluid flow to bypass the throttle plate. An example of this is disclosed in a copending application entitled "Idle Bypass System" in the name of Daryl Codling, which is hereby incorporated by reference. Although this system works well, a large size solenoid has to be used to deliver the power necessary to move the valve.

It is, therefore, one object of the present invention to provide an idle bypass flow path that will allow a predetermined amount of air to flow past the throttle plate to the intake manifold if a failure of the stepper motor occurs. It is another object of the present invention to reduce the size and power of the solenoid to move the valve from one position to another.

SUMMARY OF THE INVENTION

Accordingly, the present invention is an idle fluid flow shutoff assembly for allowing a predetermined amount of fluid flow to an intake manifold of an engine. The assembly includes a throttle body having a longitudinal axis and means forming a central passageway along the axis. A throttle plate means is disposed within the central passageway transversely to the longitudinal axis for rotation between an open and closed position to allow fluid flow through the central passageway. The throttle body includes means forming a secondary passageway having an inlet communicating with the central passageway upstream of the throttle plate means and an outlet communicating with the intake manifold downstream of the throttle plate means to allow fluid flow to bypass the throttle plate means when in the closed position. A motor means is secured to the throttle body and cooperates with the secondary passageway for allowing a predetermined amount of fluid flow through the outlet. A pressure-acuated valve means is moveable in response to the absence and presence of a predetermined pressure level and cooperates with the secondary passageway to block fluid flow to the motor means and allow a predetermined amount of fluid flow to the intake manifold when the amount of fluid flow past the motor means is not within predetermined limits.

BRIEF DESCRIPTION OF THE DRAWING

Other advantages of the present invention will be readily appreciated as the same becomes better understood by reference to the following detailed description when considered in connection with the accompanying drawing wherein:

The FIGURE is a plan view of an idle fluid flow shutoff assembly according to the present invention.

DESCRIPTION OF THE PREFERRED EMBODIMENT

Referring to the FIGURE, an idle fluid flow shutoff assembly according to the present invention is generally shown at 10. The assembly 10 includes a throttle body 12 having a generally cylindrical shape with a longitudinal axis (not shown). The throttle body 12 is mounted upon the engine in a known manner. The throttle body 12 includes a throttle plate 14 disposed transversely to the longitudinal axis within a central or primary passageway 16 formed by the throttle body 12. The throttle plate 14 is supported by a shaft (not shown) for pivotal movement about the axis of the shaft. A biasing means (not shown) is disposed at one end of the shaft to bias the throttle plate 14 in a closed or idle position as commonly known in the art. A throttle plate sensing means (not shown) is disposed at the other end of the shaft for sensing the position of the throttle plate 14 as is commonly known in the art. The sensing means relays this information to an on-board computer or electronic control unit (ECU) (not shown).

A linear drive or stepper motor 30 has one end or a pintle 32 disposed in a pocket 34 formed in the throttle body 12 and secured thereto in a known manner. The throttle body 12 includes a chamber or secondary passageway 36 formed in the throttle body 12. The stepper motor 30 is controlled by the on-board computer or ECU for metering fluid flow such as air from an inlet 38 of the secondary passageway 36 to an outlet 38 thereof which leads to an intake manifold (not shown) on the engine (not shown) downstream of the throttle plate 16. The pintle 32 of the stepper motor 30 is rotated and moved axially to open and close a seat 40 formed at one end of the pocket 34 which communicates with the secondary passageway 36 to meter various amounts of air in a known manner.

The assembly 10 also includes a solenoid-actuated valve, generally indicated at 42, disposed opposite the stepper motor 30. The valve 42 is preferably a three way vacuum switching valve. A housing 44 surrounds the solenoid-actuated valve 42 and is secured to the throttle body 12 by means such as fasteners (not shown). The solenoid-actuated valve 42 comprises a coil 46 having windings for connection to a source of electrical power (not shown) such as the ECU to produce a magnetic field, and a valve member 48 acting as the armature for movement in response to the presence or absence of the magnetic field. The valve member 48 is surrounded by the coil 46 partially at one end 50 and includes a first seal 52. The valve member 48 also has another end 54 with a second seal 56. The valve member 48 is moveable axially within a cavity 57 formed in the housing 44. The valve member 48 is smaller in diameter than the cavity 57. The first seal 52 co-operates with a first seat 58 formed by a shoulder in a pole piece 60. The pole piece 60 has an aperture 62 communicating longitudinally or axially through it for bleeding or exposing the cavity 57 to atmospheric pressure. The coil 46 partially surrounds the pole piece 60. The second seal 56 of the valve member 48 also cooperates with a second seat 64 formed by a shoulder in the housing 44 on the other side of the cavity 57. The housing 44 has a second aperture 66 communicating longitudinally or axially through it for exposing the cavity 57 to vacuum pressure from a bypass outlet 68 leading to the intake manifold of the engine. A spring 70 biases the second seal 56 into engagement with the second seat 64. The valve member 48 has a first position in which the coil 46 is de-energized and the spring 70 biases the second seal 56 into engagement with the second seat 64 and a second position in which the coil 44 is energized, moving the valve member 48 and pulling the first seal 52 against the force of the spring 70 into engagement with the first seat 58.

The throttle body 12 further includes a bypass passageway 72 formed therein which communicates with the inlet 38 and the bypass outlet 68. The bypass passageway 72 includes a fixed restriction 74 formed by an annular shoulder in the housing 44 to meter a predetermined amount of fluid flow from the inlet 38 to the bypass outlet 68.

The assembly 10 further includes a vacuum motor, generally indicated at 76, to open and close the secondary 36 and bypass 72 passageways. The vacuum motor 76 comprises a valve 78 supported by a shaft 80 which is connected to a cup shaped member 82 disposed in a packet 84 formed in the housing 44. The valve 78 cooperates with a first valve seat 86 formed by a shoulder in the throttle body 12 on one side of the inlet 38 which communicates with the secondary passageway 36. The valve 78 also cooperates with a second valve seat 88 formed by a shoulder in the throttle body 12 on the other side of the inlet 38 which communicates with the bypass passageway 72. A spring 90 is disposed between one end of the pocket 84 and one end of the cup member 82 to bias the valve 78 into engagement with the first valve seat 86. A rubber diaphram or flexible retainer 92 is disposed between the housing 44 and the throttle body 12 across pocket 84 to retain the cup member 82 within the pocket 84 and to act as a seal to prevent fluid flow between the bypass passageway 72 and pocket 84.

The housing 44 also includes a third aperture 94 formed therein which communicates with the cavity 57 and pocket 84. The valve member 48 opens and closes apertures 62 and 66 which commmunicate with cavity 57 and aperture 94 to expose the vacuum motor 76 to atmospheric or vacuum pressure.

In normal operation, the fluid flow such as air from the central passageway 16 of the throttle body 12 enters through inlet 38 into the secondary passageway 36. The coil 46 of the solenoid-actuated valve 42 is energized and the valve member 48 moves to close first aperture 62 to atmosphere and open second aperture 66 to the intake manifold. Vacuum pressure is developed and communicates through second aperture 66, cavity 57, third aperture 94 to pocket 84. As a result of the vacuum pressure, the retainer 92 flexes to move cup member 82 and valve 78 to close the second valve seat 88. Fluid flows through secondary passageway 36 and is metered through seat 40 by the stepper motor 30 and exits through the outlet 38 into the engine intake manifold downstream of the throttle plate 16.

For failure mode operation, if the stepper motor 30 failed to either allow enough idle air or too much idle air into outlet 38, as determined by the ECU through an oxygen sensor or the like, the ECU de-energizes the coil 46 of the solenoid-actuated valve 42. As a result, the valve member 48 moves to open first aperture 62 to atmosphere and to close second aperture 66 to vacuum pressure of the intake manifold. Atmospheric pressure is developed and communicates through first aperture 62, cavity 57, third aperture 94 to pocket 84. Consequently, the retainer 92 relaxes and the force of the spring 90 moves the cup member 82 and valve 78. The valve 78 engages the first valve seat 86 and closes it. This allows air flow from the inlet 38 to pass through second valve seat 88 into the bypass passageway 72 and through the restriction 74 and bypass outlet 68 into the engine intake manifold. The size or diameter of the restriction 74 controls idle speed per manufacturer's specifications, thus preventing stalling or excessive engine R.P.M.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the present invention may be practiced otherwise than as specifically described.

What is claimed is:

1. An idle fluid flow shutoff assembly for allowing a predetermined amount of fluid flow to an intake manifold of an engine, said assembly comprising:

a throttle body having a longitudinal axis and forming a central passageway along the axis;

throttle plate means disposed within said central passageway traversely to the longitudinal axis for rotation between an open and closed position to allow fluid flow through said central passageway;

said throttle body including means forming a secondary passageway and having an inlet communicating with said central passageway upstream of said throttle plate means and an outlet communicating with the intake manifold downstream of said throttle plate means to allow fluid flow to bypass said throttle plate means when in said closed position;

motor means secured to said throttle body and cooperating with said secondary passageway for allowing a predetermined amount of fluid flow through said outlet;

pressure-actuated valve means moveable in response to the absence and presence of a predetermined pressure level and cooperating with said secondary passageway for allowing a predetermined amount of fluid flow to the intake manifold when the amount of fluid flow past said motor means is not within predetermined limits.

2. The invention as set forth in claim 1 wherein said throttle body includes means forming a bypass passageway communicating with said secondary passageway and the intake manifold.

3. The invention as set forth in claim 2 wherein said pressure-actuated valve means comprises a vacuum motor having a valve moveable in response to the presence and absence of vacuum pressure and solenoid-actuated valve means for switching between a source of atmospheric pressure and a source of vacuum pressure to actuate said valve of said vacuum motor.

4. The invention as set forth in claim 3 wherein said solenoid-actuated valve means comprises a coil for connection to a source of electrical power and being energized and de-energized in the presence and absence of electrical power, and a valve member moveable in response to said coil being energized and de-energized.

5. The invention as set forth in claim 4 including means forming a first valve seat on one side of said inlet, said valve cooperating with said first valve seat to block fluid flow to said motor means when said coil is de-energized.

6. The invention as set forth in claim 5 including means forming a second seat on the other side of said inlet, said valve cooperating with said second seat to block fluid flow to said bypass passageway when said coil is energized.

7. The invention as set forth in claim 6 including biasing means for biasing said valve toward said first valve seat.

8. The invention as set forth in claim 7 wherein said vacuum motor comprises a cup member, a shaft interconnecting said valve and said cup member, and a flexible retainer secured to said throttle body to move said cup member when exposed to vacuum pressure and limit axial movement when exposed to atmospheric pressure.

9. The invention as set forth in claim 8 wherein said bypass passageway has a fixed restriction of a predetermined diameter to allow a predetermined amount of fluid to flow to the intake manifold.

10. The invention as set forth in claim 9 including a housing enclosing said vacuum motor and said coil and said valve member.

11. The invention as set forth in claim 10 wherein said housing includes means forming a cavity within said housing, said valve member being moveable axially within said cavity.

12. The invention as set forth in claim 11 wherein said housing includes means forming an aperture therein communicating with said cavity and said bypass passageway downstream of said fixed restriction.

13. The invention as set forth in claim 12 wherein said housing includes means forming an aperture therein communicating with said cavity and said vacuum motor.

14. The invention as set forth in claim 13 wherein said solenoid-actuated valve further comprises a pole piece having one end axially spaced from one end of said valve member and having an aperture communicating therethrough to atmospheric pressure.

15. The invention as set forth in claim 14 wherein said valve member includes a first seal at one end and a second seal at the other end.

16. The invention as set forth in claim 15 wherein said housing includes means forming a first seat at one end of said cavity and said aperture, said valve member cooperating with said first seat to open and close said aperture to vacuum pressure.

17. The invention as set forth in claim 16 wherein said housing includes means forming a second seat at the other end of said cavity and said aperture to atmospheric pressure, said valve member cooperating with said second seat to open and close said aperture to atmospheric pressure.

18. An idle fluid flow shutoff assembly for allowing a predetermined amount of fluid flow to an intake manifold of an engine, said assembly comprising:
a throttle body having a longitudinal axis and forming a central passageway along said axis;
throttle plate means disposed within said central passageway traversely to said longitudinal axis for rotation between an open and closed position to allow fluid flow through said central passageway;
said throttle body including means forming a secondary passageway and having an inlet communicating with said central passageway upstream of said throttle plate means and an outlet communicating with the intake manifold downstream of said throttle plate means to allow fluid flow to bypass said throttle plate means when in said closed position;
motor means secured to said throttle body and cooperating with said secondary passageway for allowing a predetermined amount of fluid flow through said outlet; and
pressure-actuated valve means moveable in response to the absence and presence of a predetermined pressure level and cooperating with said secondary passageway for allowing a predetermined amount of fluid flow to the intake manifold when the amount of fluid flow past said motor means is not within predetermined limits;
said throttle body includes means forming a bypass passageway communicating with said secondary passageway and the intake manifold; and
said pressure-actuated valve means comprising a vacuum motor having a valve moveable in response to the presence and absence of vacuum pressure and a solenoid-actuated valve means for switching between a source of atmospheric pressure and a source of vacuum pressure to actuate said valve of said vacuum motor.

19. The invention as set forth in claim 18 wherein said solenoid-actuated valve means comprises a coil for connection to a source of electrical power and being energized and de-energized in the presence and absence of electrical power, and a valve member moveable in response to said coil being energized and de-energized.

20. The invention as set forth in claim 19 wherein said bypass passageway has a predetermined diameter to allow a predetermined amount of fluid to flow to the intake manifold.

21. An idle fluid flow shutoff assembly for allowing a predetermined amount of fluid flow to an intake manifold of an engine, said assembly comprising:
a throttle body having a longitudinal axis and forming a central passageway along the axis;
throttle plate means disposed within said central passageway traversely to the longitudinal axis for rotation between an open and closed position to allow fluid flow through said central passageway;
said throttle body including means forming a secondary passageway and having an inlet communicating with said central passageway upstream of said throttle plate means and an outlet communicating with the intake manifold downstream of said throttle plate means to allow fluid flow to bypass said throttle plate means when in said closed position;
motor means secured to said throttle body and cooperating with said secondary passageway for allowing a predetermined amount of fluid flow through said outlet;
pressure-actuated valve means moveable in response to the absence and presence of a predetermined pressure level and cooperating with said secondary passageway for allowing a predetermined amount of fluid flow to the intake manifold when the amount of fluid flow past said motor means is not within predetermined limits;

said throttle body includes means forming a bypass passageway communicating with said secondary passageway and the intake manifold;

said pressure-actuated valve means comprises a vacuum motor having a valve moveable in response to the presence and absence of vacuum pressure and solenoid-actuated valve means for switching between a source of atmospheric pressure and a source of vacuum pressure to actuate said valve of said vacuum motor;

said solenoid-actuated valve means comprises a coil for connection to a source of electrical power and being energized and de-energized in the presence and absence of electrical power, and a valve member moveable in response to said coil being energized and de-energized;

means forming a first valve seat on one side of said inlet, said valve cooperating with said first valve seat to block fluid flow to said motor means when said coil is de-energized;

means forming a second seat on the other side of said inlet, said valve cooperating with said second seat to block fluid flow to said bypass passageway when said coil is energized;

biasing means for biasing said valve toward said first valve seat;

said vacuum motor comprises a cup member, a shaft interconnecting said valve and said cup member, and a flexible retainer secured to said throttle body to move said cup member when exposed to vacuum pressure and limit axial movement when exposed to atmospheric pressure;

said bypass passageway has a fixed restriction of a predetermined diameter to allow a predetermined amount of fluid to flow to the intake manifold;

a housing enclosing said vacuum motor and said coil and said valve member;

said housing includes means forming a cavity within said housing, said valve member being moveable axially within said cavity;

said housing includes means forming an aperture therein communicating with said cavity and said bypass passageway downstream of said fixed restriction;

said housing includes means forming an aperture therein communicating with said cavity and said vacuum motor;

said solenoid-actuated valve further comprises a pole piece having one end axially spaced from one end of said valve member and having an aperture communicating therethrough to atmospheric pressure;

said valve member includes a first seal at one end and a second seal at the other end;

said housing includes means forming a first seat at one end of said cavity and said aperture, said valve member cooperating with said first seat to open and close said aperture to vacuum pressure; and said housing includes means forming a second seat at the other end of said cavity and said aperture to atmospheric pressure, said valve member cooperating with said second seat to open and close said aperture to atmospheric pressure.

* * * * *